United States Patent Office 2,985,702
Patented May 23, 1961

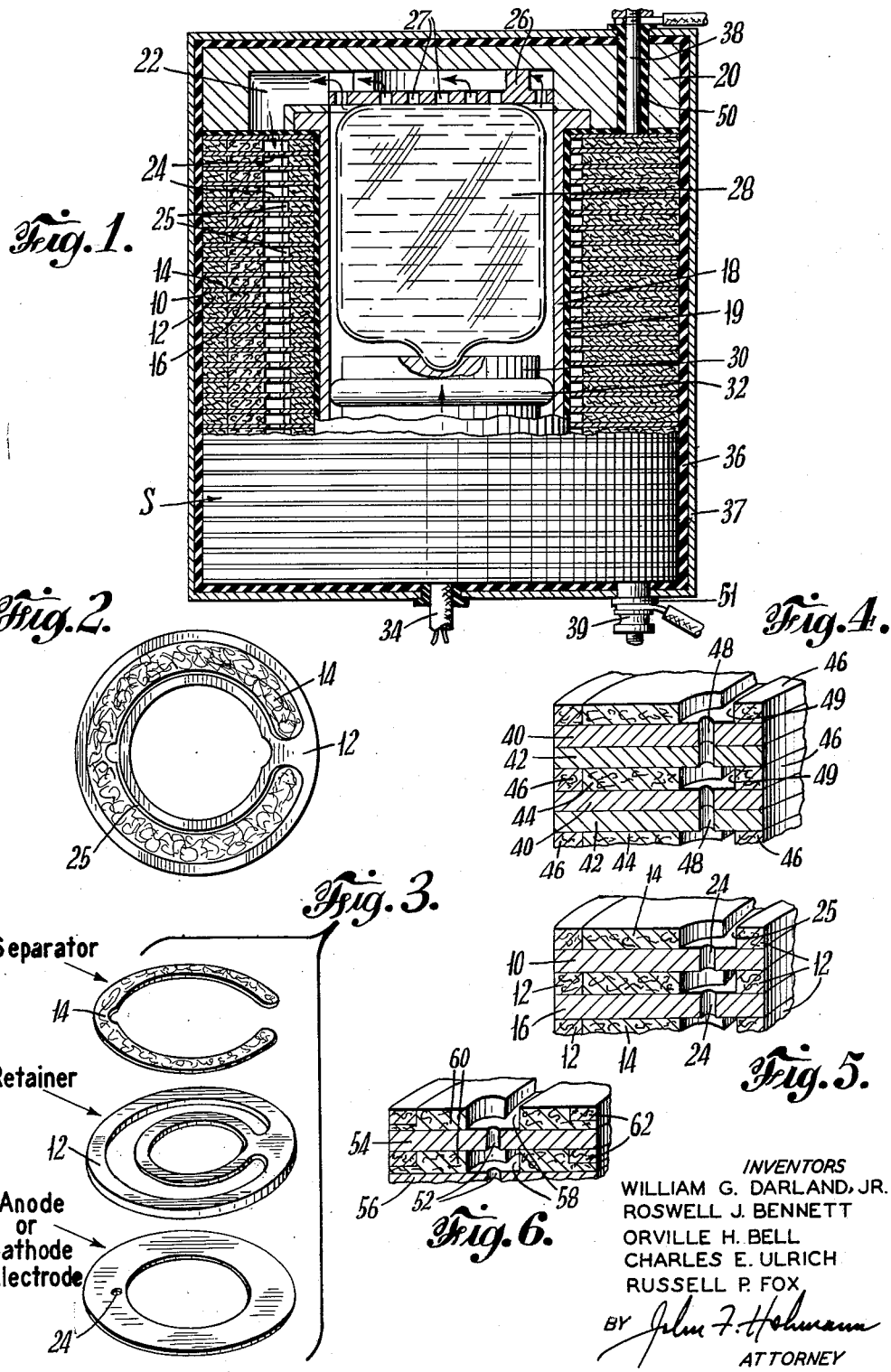

2,985,702
DEFERRED ACTION BATTERY

William G. Darland, Jr., Parma, and Roswell J. Bennett, Lakewood, Ohio, and Orville H. Bell, South Shaftsbury, and Charles E. Ulrich, Bennington, Vt., and Russell P. Fox, Elyria, Ohio, assignors to Union Carbide Corporation, a corporation of New York Filed Oct. 17, 1957, Ser. No. 690,781

4 Claims. (Cl. 136—90)

This invention relates to deferred action primary cells and refers more particularly to cells of the type required to be instantly activated upon demand.

For certain military uses, such as in artillery shells and the like, operation of some components is powered by primary batteries. Since operation is desired only at the moment of use, these batteries are of the deferred action type, and it is essential that the battery be activated substantially instantaneously when it is called upon for service. The necessity for instant activation requires rapid introduction of an electrolyte to the elements of the battery. In devices such as artillery shells, advantage is taken of the centrifugal force attributable to the spin of the shell. In other devices the set-back caused by rapid acceleration is relied upon for proper, rapid activation of the battery. For use in devices in which neither spin nor set-back forces are adequate, of course these systems are not practical for activation of the battery. Activation of batteries composed of a great number of cells is particularly difficult under any conditions. There is consequently a demand for a deferred action battery which may be activated instantaneously upon demand irrespective of the presence or absence of spin or set-back forces in the device for which such battery is intended.

It is the principal object of this invention to satisfy this demand. More specifically, it is an important object of the invention to provide a deferred action primary battery in which a liquid electrolyte may be introduced substantially instantaneously to all of the elements of the battery at the time required for the intended use of the device of which the battery may be a component.

The invention by means of which these objects are achieved comprises a battery composed of a stack of annular cell elements including bibulous separators so arranged as to soak up and distribute uniformly liquid electrolyte when it is introduced. In combination with the stack of cell elements, and arranged centrally of the annular members, is a supply of liquid electrolyte in a frangible ampule supported by a movable piston which may be activated by any suitable mechanism such as an electrically operated squib to fracture the ampule and to force the electrolyte into the stack of cells.

In the drawing,

Fig. 1 is a vertical elevation, partially in section, of a deferred action battery embodying the invention;

Fig. 2 is a plan view of an assembly of separator and retainer utilized in the cells of the battery of the invention;

Fig. 3 is an exploded view of cell elements, including separator, retainer and electrode;

Fig. 4 is a partial vertical section of an arrangement of cell elements suitable for use in a battery embodying the invention;

Fig. 5 is similar to Fig. 4, illustrating another arrangement of cell elements; and Fig. 6 illustrates in section similar to Fig. 4 still another arrangement of cell elements.

Referring to the drawing, an assembly embodying the invention comprises a stack S of annular cell elements, arranged, for example, in parallel connection as illustrated in Fig. 5 and comprising cathodes 10, retainers 12, bibulous separators 14 and anodes 16. As will be seen from Fig. 5, the outside diameter of the separators 14 is less than the outside diameter of the anodes 16 and cathodes 10, while the inside diameter of the separators 14 is greater than the inside diameter of the cathodes 10 and anodes 16. The retainers 12 are so designed as shown in Figs. 2 and 3 to occupy the space provided by this difference in diameters except for a channel 25, communicating with a filling aperture 24 to be referred to below which distributes the electrolyte to the inner periphery of the separator 14.

The stack S is arranged with its central aperture adjacent to a cylindrical steel member 18 coated with electrically insulating material 19, and is closed at one end by a cap member 20 overlying the top of the stack S and having an aperture 22 communicating with apertures 24 provided in each of the cell elements so as to define in the stack a conduit for the passage of electrolyte. A screen member 26, having apertures 27 communicating with the aperture 22, is provided in the cap member 20 adjacent to a frangible ampule 28 placed within the cylindrical member 18. Closing the opposite end of the cylindrical member 18, supporting the ampule 28, is a movable piston 30, having mounted thereon in sealing engagement with the walls of the cylindrical member 18, a seal ring 32. The piston is actuatable by any conventional means such as an electrical squib, not shown, to which conventional electrical connection 34 is made. The entire unit is housed in a suitable insulating container 36, preferably enclosed in a metal container 37. Terminals 38 and 39 electrically connected to the stack S are insulated from the metal container 37 by suitable insulating bushings 50 and 51.

Fig. 4 illustrates a modified form of arrangement of cell elements for series connection in which a duplex electrode having an anode surface 40 and a cathode surface 42 is employed. In this arrangement a separator 44 and retainer 46 are placed between the cathode surface 42 of one electrode and the anode surface 40 of another electrode. Similar to the construction shown in Fig. 5 in this arrangement apertures 48 are provided in the duplex electrodes for the passage of electrolyte, and these apertures 48 communicate with channels 49 provided between the separators 44 and retaining rings 46.

As shown in Fig. 6, which is similar to Fig. 5 in illustrating a parallel arrangement of cell elements, filling apertures 52 are provided in the central portion of the annular anode 54 and cathode 56. In the construction illustrated, channels 58 to communicate with the apertures 52 are provided in the central portion of separators 60 held in place between anodes 54 and cathodes 56 by retaining rings 62.

Referring now particularly to Fig. 1, in operating the device of the invention an actuating impulse is transmitted to the piston 30 upon demand. The piston is caused to move against the ampule 28, fracturing it. The piston continues its motion to force the electrolyte originally present in the ampule out the aperture 22 in the cap 20 and into the apertures 24 in the stack S in the path indicated by the arrows in Fig. 1 of the drawing. Escape of electrolyte from the cylindrical member 18 in any other path is prevented by the seal ring 32. Fragments of the ampule 28 are prevented from passing into the aperture 22 and the stack of cells by the screen member 26. When the electrolyte enters the conduit formed by the apertures 24, by reason of its being forced out of the cylindrical member 18, it immediately is communicated to all of the cell elements of the stack S and distributed to the inner periphery of the separator 14 by way of the channel 25. The bibulous separators 14 rapidly soak up the electrolyte and thereby wet the electrode members. Intercell short circuiting is prevented because the separators absorb all of the liquid electrolyte, and having a greater internal diameter than the other cell elements, cause the electrolyte to be retracted from the apertures 24. The retainers 12 serve to keep the separators in place and aid in preventing the passage of liquid electrolyte along the edges of the individual cell elements to the next cell. It is important, of course, that the quantity of electrolyte originally provided in the ampule 28 not be in excess of the amount required for a thorough wetting of each of the separator elements, for the presence of an excess quantity of liquid would tend to cause internal short circuits.

Devices embodying the invention have been built and operated with complete success. Amongst the electrochemical systems which have been utilized may be mentioned the system lead-lead dioxide-fluoboric acid. For the fluoboric acid has been substituted perchloric acid, methane-sulfonic acid, sulfamic acid, and nitric acid. Other electrochemical systems include: the zinc-carbon-chromic acid system, and the zinc-manganese dioxide-potassium hydroxide system. The separator may be of any material resistant to the electrolyte used and which is capable of absorbing the electrolyte rapidly. With fluoboric acid electrolyte, a fibrous paper like a conventional filter paper is suitable. Textile fibers or wood fibers may be used to form these separators and film-type, non-fibrous materials resistant to electrolyte may also be employed.

Illustrative of the rapid activation of batteries embodying the invention, batteries constructed as illustrated in Fig. 1 have been produced having an outside diameter of 1½ inches and being 1½ inches long. Utilizing the lead-lead dioxide-fluoboric acid system, such batteries have been activated to deliver their full voltage in $1/10$ to $3/10$ second. Such batteries are useful in the temperature range $-90°$ F. to $+210°$ F.

It will be evident to those skilled in the art that the actuating forces for moving the piston in the device of the invention may be derived from any of a number of sources. For instance, a percussion cap may provide the force as well as the electrical squib referred to specifically above. Other conventional sources of such forces include compressed gases provided in suitable capsules. For some uses a mechanical plunger may be entirely satisfactory. The invention is not limited to the use of any particular device of this kind.

We claim:

1. In combination a stack of annular battery elements having apertures therein aligned to form a continuous passage through said stack, said battery elements including bibulous separators adapted to soak up electrolyte and to distribute the same into contact with electrode elements; an electrolyte impervious cylinder within the central aperture of said annular stack, said cylinder being closed at one end by a cap member having an aperture therein communicating with the apertures in said battery elements, and being closed at its other end by a movable piston, said piston and cap member supporting a frangible ampule of electrolyte for said battery elements, and means for actuating said piston to fracture said ampule and to force electrolyte therefrom through said aperture in said cap member and into communication with said battery elements through the apertures therein.

2. In the combination defined by claim 1, retainer rings adapted to retain said separators in position when said separators are wet with electrolyte.

3. In the combination defined by claim 2 the improvement wherein the outside diameter of said separators is less than the outside diameter of electrode elements, and the inside diameter of said separators is greater than the inside diameter of said electrode elements.

4. In the combination defined by claim 1, a stainless steel cylinder.

References Cited in the file of this patent

UNITED STATES PATENTS

| | | |
|---|---|---|
| 2,403,567 | Wales | July 9, 1946 |
| 2,404,144 | Riggs et al. | July 16, 1946 |
| 2,441,896 | Moir | May 18, 1948 |
| 2,502,723 | Harriss | Apr. 4, 1950 |
| 2,674,946 | Hjelm | Apr. 13, 1954 |
| 2,684,988 | Wilburn | July 27, 1954 |
| 2,787,650 | Blaru | Apr. 2, 1957 |
| 2,806,895 | Dines | Sept. 17, 1957 |